United States Patent [19]

Bieganski

[11] 4,072,069

[45] Feb. 7, 1978

[54] WIRE STRIPPING TOOLS

[76] Inventor: Zdzislaw Bieganski, Brushwood, Kingsbourne Green, Harpenden, Hertfordshire, England

[21] Appl. No.: 674,582

[22] Filed: Apr. 7, 1976

[30] Foreign Application Priority Data

Apr. 12, 1975 United Kingdom ............... 15102/75

[51] Int. Cl.$^2$ ............................................. H02G 1/12
[52] U.S. Cl. .................................................... 81/9.5 A
[58] Field of Search ................... 81/9.5 A, 9.5 R, 9.51

[56] References Cited

U.S. PATENT DOCUMENTS

| 3,176,550 | 4/1965 | Marcotte | 81/9.51 |
| 3,422,708 | 1/1969 | Bieganski | 81/9.5 A |
| 3,638,518 | 2/1972 | Parker | 81/9.51 |
| 3,765,277 | 10/1973 | Sorensen | 81/9.5 A |

Primary Examiner—James L. Jones, Jr.
Assistant Examiner—Roscoe V. Parker
Attorney, Agent, or Firm—Marshall & Yeasting

[57] ABSTRACT

The invention provides a tool for stripping the sheath or covering from a wire or cable, comprising a pair of gripping jaws for holding the sheath and a pair of cutting jaws for cutting the sheath, means for closing the pairs together and then for separating the pairs so as to displace the cut portion relative to the gripped portion, in which the displacing means includes a lost motion coupling so that an initial portion of the displacement is used for jaw closing but without effecting relative displacement, and with the jaw closing being effected by a cam which is arranged to provide for jaw opening at the end of the displacement movement.

2 Claims, 4 Drawing Figures

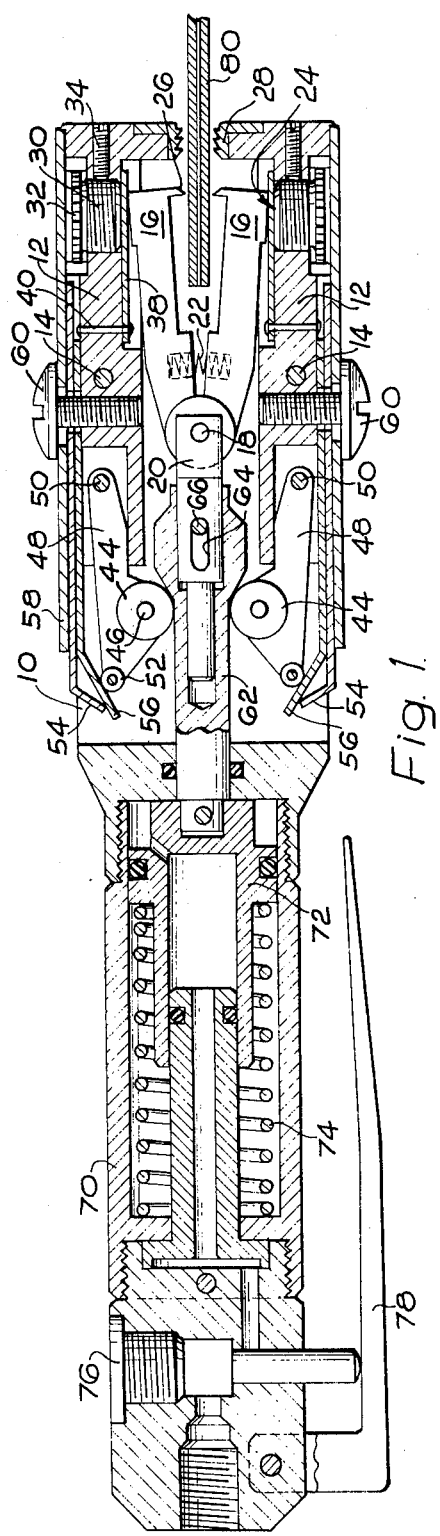
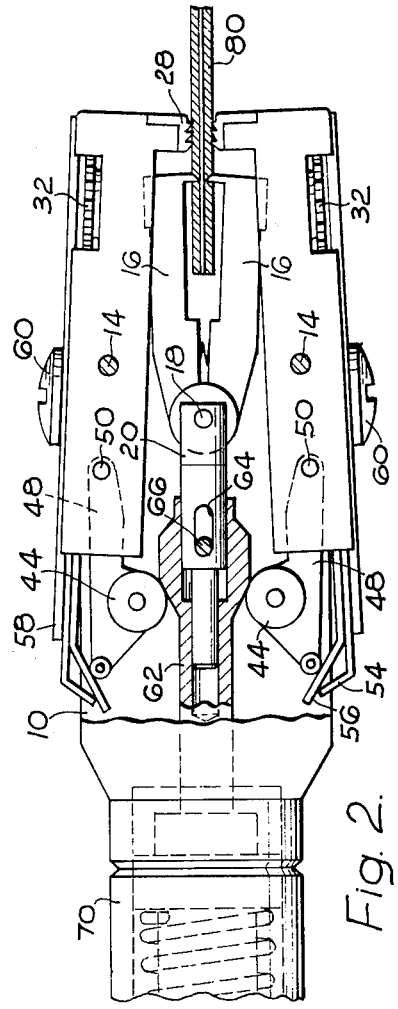
Fig. 1.
Fig. 2.

WIRE STRIPPING TOOLS

BACKGROUND OF THE INVENTION

This invention relates to tools for stripping the sheaths or coverings from wires, cables, and the like, for example from the end portions of the same. This may be accomplished by making a cut or cuts wholly or partly through the sheath, and then displacing the sheath and the core relative to one another.

The object of the present invention is to provide a simplified tool for these purposes.

SUMMARY OF THE INVENTION

In accordance with the present invention, a wire stripping tool comprises a first pair of gripping jaws, a second pair of cutting jaws located between the first pair, an axially movable part coupled to the second jaws by a lost motion device whereby a first part of an axial movement is effected without displacing the second pair of jaws, and a second part of said movement displaces the second pair of jaws relative to the first, and cam and abutment means between the said part and the first pair of jaws whereby axial movement closes both pairs of jaws before the displacement occurs.

The axially movable part may comprise a pneumatic cylinder, or a manually movable part, or any motorised part and the cam and abutment means are arranged so that in a single stroke of the part the jaws are closed, relatively displaced, and then opened permitting release of the wire which has been stripped due to the cutting jaws engaging in the covering and then being displaced to pull the covering along the core.

Preferably also the first pair of jaws carry the abutments which are arranged to act as cam followers, the cam being mounted on the axially movable part to travel therewith from a position on one side of the followers, between the followers and to the other side of the same, this causing the jaw closing and opening movements.

BRIEF DESCRIPTION OF THE DRAWINGS

FIG. 1 is a sectional elevation of a tool in a first position;

FIGS. 2 to 4 are fragmentary views of the same showing successively, second, third and fourth positions.

DESCRIPTION OF THE PREFERRED EMBODIMENT

Figure 3:
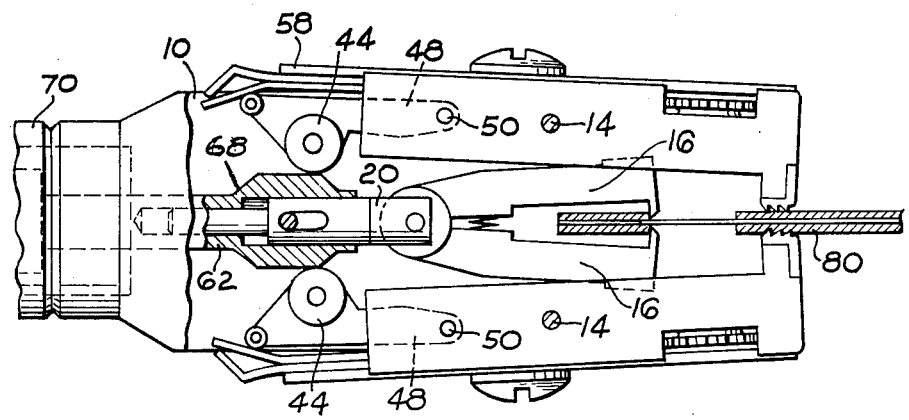

Referring now to the drawings, particularly to FIG. 1 thereof, the tool shown comprises a bifurcated body 10 which houses, between its two parallel portions, a pair of first jaws 12, each of which is pivoted on a corresponding cross pin 14, the two cross pins being parallel to one another, and the ends of the cross pins being received in the two body portions. Hence the jaws 12, which form gripping jaws, can pivot from a parallel position as in FIGS. 1 and 4 to the intermediate and relatively inclined positions of FIGS. 2 and 3.

Located between the gripping jaws 12 is a second pair of jaws 16, which are pivoted on a common pin 18 carried at one end of a stem 20. A compression spring 22 between the two jaws 16 urges them apart and takes the heels 24 of the jaws towards the adjacent surfaces of the gripping jaws 12.

Jaws 16 are provided with inwardly directed chisel like cutting portions 26 and jaws 12 are provided with inwardly directed and conveniently serrated gripping portions 28.

Each of the gripping jaws 12 is provided with an adjuster 30 in screw-threaded engagement with a corresponding bore in the jaw, a milled head 32 of the same being adapted for rotation of the adjuster, and a radial detent 34 providing frictional or other resistance to rotation. A spring blade 38 is fixed to the inner surface of each jaw 12 by rivet 40 so as to provide an abutment surface for the heel 24, and when the adjusters are moved so as to contact the spring blades 38 and displace them from the inner surface of the jaws 12 the effect is to cause the gripping jaws to remain more widely separated when the cutting jaws close, i.e. to adapt the tool for a cable with a thicker sheath.

Each gripping jaw 12 carries a cam follower in the form of a roller 44 journalled on the pin 46 carried by a lever arm 48 which in turn is supported on a cross pin 50 in a corresponding gripping jaw 12. The lever arms also carry rollers 52 at the ends opposite to the pins 50.

A pair of spring blades 54 56 is fixed to each jaw 12 with a rigid clamping plate 58 sandwiching the spring blades between itself and the jaw, and the assembly being held in place by screw 60.

The stem 20 is connected to piston rod 62 by a lost motion device, comprising slot 64 in the stem and cross pin 66 in the rod. The rod is provided with a cam 68.

The body 10 is connected to a handle 70 which forms a cylinder housing piston 72. The piston is urged by compression spring 74, to the FIG. 1 position, and pressurized fluid, for example compressed air is admitted to the cylinder under the control of a valve 76 under the control of a hand lever 78.

One complete cycle of operations will now be more particularly described.

It will be noted that in the FIG. 1 position both pairs of jaws are separated, and a cable 80 is located between the jaws. Assuming then that pneumatic pressure is admitted to the cylinder to drive piston 72 towards the left as seen in FIG. 1 then the piston rod 62 travels to the left so as to cause the cam 68 to engage against the twin rollers 44 and separate them, in a transverse direction relative to movement of the piston rod, although it is noted that at this time the stem 20 remains stationary, due to the lost motion device because the pin 66 is moving along the length of the slot 64.

Due to the resistance provided by blade springs 54 56, the separation of the rollers 44 causes pivoting of the jaws 12 so as to take the gripping surfaces 28 towards one another and hence grip the cable sheath therebetween. Because the heels 24 of the cutting jaws 16 are in contact with the gripping jaws, the cutting jaws are also moved towards one another so as to cut into the cable sheath, as generally indicated in FIG. 2.

As the piston rod movement continues the tool reaches the FIG. 3 position which shows the rollers held in the separated position by virtue of the cylindrical portion of the cam, and because the lost motion has been taken up, the stem 20 has now moved to the left with the piston rod so as to displace the cutting jaws 16 relative to the gripping jaws and hence strip the sheath from the core of the cable.

Figure 4:
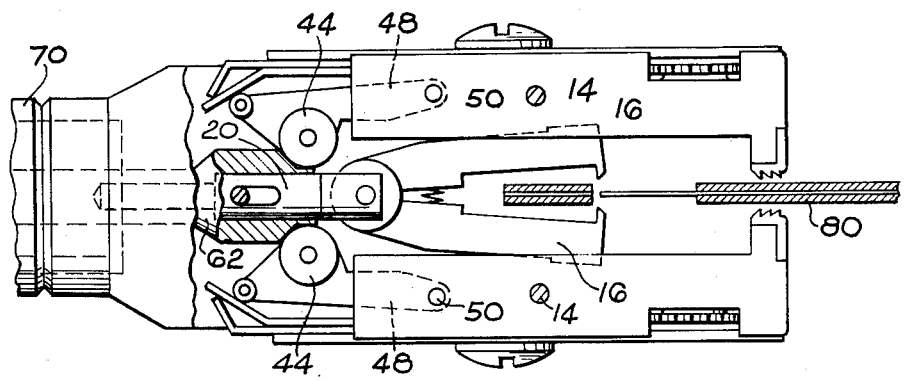

In FIG. 4 the piston rod stroke is completed, and the rollers 44 have returned relative to the FIG. 1 position, having over-ridden the cam, thus allowing both pairs of jaws to be separated, aided by the action of the blade springs and also the spring 22. The stripped cable can then be removed from the tool.

In the reverse stroke of the pneumatic cylinder, the first action is for the lost motion to be taken up as the pin 66 moves along the length of the slot 64, and then the parts are effectively returned to the FIG. 1 position.

The action of the adjusters is to enable cables having a thicker or thinner sheath relative to the overall diameter of the cable to be dealt with, in that for example by screwing both adjusters towards the cutting jaws, the cutting jaws will be caused to close before the gripping jaws are closed (cutting a cable with a thicker sheath) and vice versa. However, the design is inherently capable of dealing with a wide range of variations of overall diameters and ratios of core thickness to sheath thickness, particularly if the cutting jaws 16 are provided as a series of parallel laminations, so as to be able to move individually and collectively conform to the cross-section of the cable.

The adjusters may be accessible from the side of the tool to enable the milled heads to be turned.

The spring action particularly in relation to the lever arms 48 may be varied, particularly by adjusting the axial position of the rigid plates 58, by use of the elongated slot in the same relative to the clamping screws 60. A small amount of movement may have a significant effect particularly because of the shape of the blade springs in the vicinity of the rollers 52.

The length of the stripped end of the cable will depend upon the length of cable which is fed between the jaws in the FIG. 1 position. Whether the stripped sheath is entirely removed from the core (as illustrated in FIG. 4) or not will depend upon whether the stripped length is less than or more than the displacement of the cutting jaws relative to the gripping jaws.

It will be seen that if a pneumatic cylinder is not employed, other manual or motor driven means are necessary for reciprocating a part which is equivalent to piston rod 62.

I claim:

1. A wire stripping device comprising a body having a pair of gripping jaws pivoted thereon, a cylinder fixed to the body having an axially movable piston and piston rod, and a pair of cutting jaws which are pivoted to a member that has a lost motion connection with the piston rod, to permit limited initial motion of the piston rod relative to said member, wherein the improvement comprises a cam mounted on the piston rod and having a first jaw-closing surface, a second dwell surface to hold the gripping jaws closed, and a third jaw-opening surface, the cutting jaws being arranged between and in driving contact with the gripping jaws for actuation by the gripping jaws, cam followers including levers pivoted on the gripping jaws, spring means urging the cutting jaws apart into said driving contact with the gripping jaws, the cam surfaces being arranged to close both pairs of jaws during initial movement of the piston rod relative to said member, to hold the gripping jaws closed during further movement of the piston carrying along said member, and to open both pairs of jaws during still further movement of the piston and member, and resilient means fixed to the gripping jaws providing resistance to said levers during movement of the piston rod.

2. A wire stripping device as claimed in claim 1 wherein the gripping jaws when closed are slightly inclined toward one another, whereby the cutting jaws are permitted to open under the influence of said spring means as the member to which they are pivoted is retracted by the piston rod.

* * * * *